(12) United States Patent
Månsson

(10) Patent No.: US 7,223,076 B2
(45) Date of Patent: May 29, 2007

(54) PROPELLER SHAFT AND A PROPELLER ADAPTED THERETO

(75) Inventor: Staffan Månsson, Myggenäs (SE)

(73) Assignee: AB Volvo Penta, Gothenburg (SE)

( * ) Notice: Subject to any disclaimer, the term of this patent is extended or adjusted under 35 U.S.C. 154(b) by 0 days.

(21) Appl. No.: 10/513,225

(22) PCT Filed: Apr. 29, 2003

(86) PCT No.: PCT/SE03/00687

§ 371 (c)(1),
(2), (4) Date: Jul. 22, 2005

(87) PCT Pub. No.: WO03/093107

PCT Pub. Date: Nov. 13, 2003

(65) Prior Publication Data

US 2006/0165531 A1    Jul. 27, 2006

(30) Foreign Application Priority Data

May 3, 2002    (SE)    ................................. 0201344

(51) Int. Cl.
*B63H 23/34*    (2006.01)
(52) U.S. Cl. ............................. 416/204 R; 416/244 B; 416/245 A; 440/83

(58) Field of Classification Search .............. 416/93 A, 416/134 R, 244 B, 245 A, 204 R; 415/216.1; 403/359.1, 359.5, 359.6; 440/49, 83
See application file for complete search history.

(56) References Cited

U.S. PATENT DOCUMENTS

| 648,352 | A | * | 4/1900 | Blanton, Jr. ............ 416/244 B |
| 3,876,331 | A | | 4/1975 | Den Herder et al. |
| 4,689,027 | A | | 8/1987 | Harada et al. |
| 5,533,794 | A | * | 7/1996 | Faison ..................... 301/105.1 |
| 5,795,037 | A | * | 8/1998 | Hagelthorn ............. 301/124.1 |
| 6,290,442 | B1 | * | 9/2001 | Peterkort .................... 411/140 |
| 7,000,995 | B2 | * | 2/2006 | Hagelthorn ............. 301/105.1 |
| 7,029,218 | B2 | * | 4/2006 | Peterkort .................... 411/198 |

* cited by examiner

*Primary Examiner*—Richard A. Edgar
(74) *Attorney, Agent, or Firm*—Young & Thompson

(57) ABSTRACT

Propeller shaft (2) and a propeller (7) for marine drive units. The shaft has a splines portion (3) on which the propeller is designed to be fixed. The shaft also has a threaded portion (10) for a lock nut between the shaft end and the splines portion for axial fixing of the propeller. The splines portion (3) on the shaft has keyways/grooves (4) which are narrower than the keys (5) therebetween, where the propeller has a hub (6) with corresponding keys (8) and keyways (9).

8 Claims, 2 Drawing Sheets

PROPELLER SHAFT AND A PROPELLER ADAPTED THERETO

BACKGROUND OF THE INVENTION

The present invention relates to a propeller shaft for marine drive units, comprising a first portion with alternating external axial keyways and keys designed for fitted engagement with internal keys and keyways on a hub portion of a propeller and, between one end shaft and said first portion, a second portion with external threads for engagement with an element provided with internal threads.

The invention also relates to a propeller for marine drive units, comprising a hub portion with alternating internal keyways and keys intended to engage corresponding external keys and keyways on a propeller shaft portion.

DESCRIPTION OF THE RELATED ART

A number of solutions for fixing a propeller axially and rotationally on a propeller shaft are previously known. For rotationally fixing of the propeller on the shaft, usually there are used conventional external splines with uniform keyways/grooves and keys on the shaft, in engagement with corresponding internal splines in the propeller hub. For axial fixation, there is usually a shoulder on the shaft against which an end surface on the propeller hub is pressed with the aid of a lock nut abutting against an opposite end surface of the hub. The lock nut is screwed onto the threaded end portion of the propeller shaft. The lock nut in turn can be locked by a lock screw screwed into a threaded bore in the shaft or by a locked washer bent against one side of the nut and being rotationally fixed relative to the shaft.

Both for production reasons and for materials strength reasons, it is an advantage if the threaded shaft portion can have the same diameter, and not a reduced diameter, in relation to the spline shaft portion engaging the splines of the propeller hub. In order to be able to push the propeller onto the shaft to the end position, the threaded end portion of the shaft must also be provided with splines fitting the splines of the propeller hub. The grooves or keyways which cut through the threads affect the quality of the thread and increase the risk that the lock nut will jam, making mounting more difficult. Furthermore, the thread engagement is weakened.

SUMMARY OF THE INVENTION

The purpose of the present invention is to achieve a propeller shaft and a propeller hub of the type described by way of introduction, whereby the above mentioned disadvantages are eliminated.

This is achieved according to the invention firstly with a propeller shaft, said first portion of which is provided with keyways, which are narrower than the keys therebetween and, secondly, with a propeller with a hub portion, provided with keyways which are broader than its keys.

For a given installation it has been shown that the keys and the propeller shaft can be made twice as wide as the keyways in the propeller shaft, and in a corresponding manner the keyways in the hub can be made twice as wide as the keys in the hub, without shortening the life of the connection. Due to the fact that the breaks in the thread caused by the grooves can be reduced by one half, the quality of the thread can be improved substantially, which facilitates mounting of the lock nut.

The propeller shaft design according to the invention is particularly advantageous in a tubular shaft, for example the outer shaft in a marine drive unit with concentric shafts and double propellers, where the cavity in the shaft, and thus the thickness of the metal, limits the possibility of reducing the diameter of the threaded portion relative to the splines portion. Due to the fact that the diameter of the tubular shaft is larger than that of the inner shaft, the number of spline keys and keyways in the tubular shaft can be essentially equal to the number of keys and keyways in a conventional splines coupling for the inner shaft.

BRIEF DESCRIPTION OF THE DRAWINGS

The invention will be described below with reference to examples shown in the accompanying drawings, where FIG. 4 is an enlargement of an end of the propeller shaft of the drive in FIG. 1.

Figure 1A:
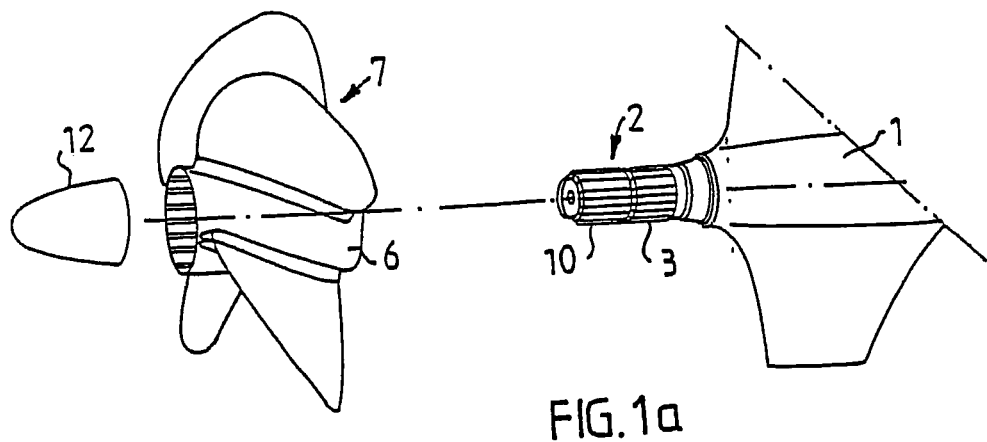
FIG. 1 shows an exploded view of the underwater housing and the propeller of a single propeller drive for boats.
Figure 1B:
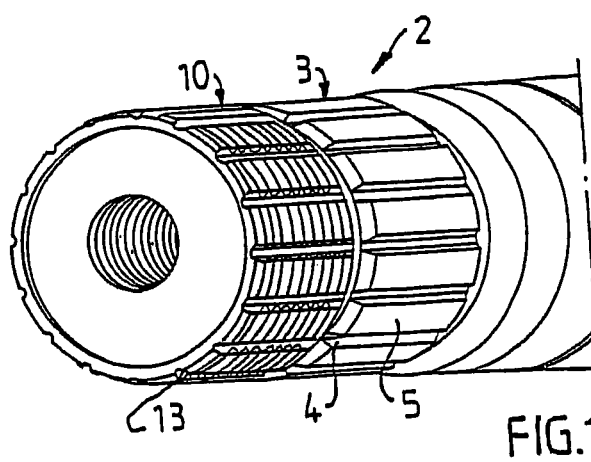
Figure 3:
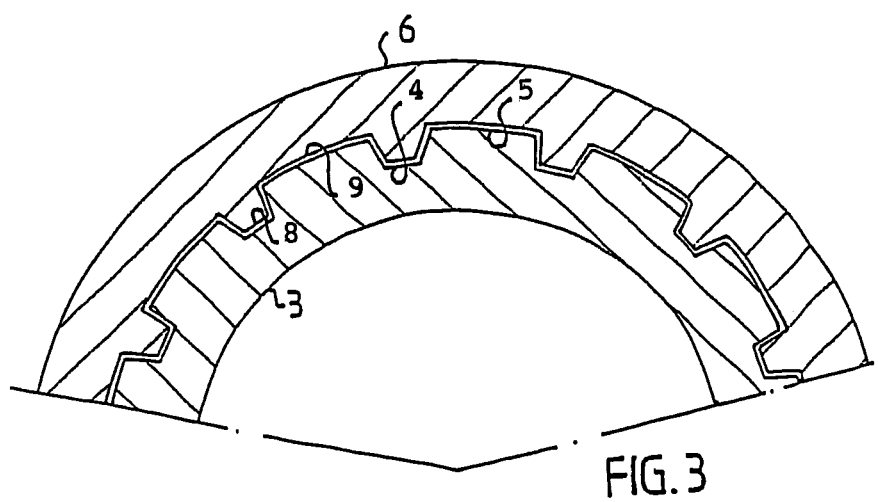
FIG. 3 is a cross section through a portion of the tubular shaft in FIG. 5 and a portion of a propeller hub.

Number 1 in FIG. 1 designates the underwater housing in an outboard boat drive. The drive can be a transom-mounted drive with a pushing propeller or a bottom-mounted drive with a pulling propeller. In the underwater housing 1, a propeller shaft, generally designated 2, is mounted. The propeller shaft is provided at a first portion 3 with keyways or grooves 4 and keys 5, by means of which a propeller hub portion 6 of a propeller 7 is to be rotationally fixed. For this purpose, the propeller hub portion 6 is provided with corresponding keys 8 and keyways 9 (FIG. 3) designed to engage the keyways 4 and keys 5 on the shaft 1. The hub portion 6 can be a complete hub, provided with propeller blades, or an inner hub bushing, for example inside a rubber bushing on which an outer hub portion with propeller blades is fixed.

The propeller hub portion 6 is designed to be fixed axially with the aid of a lock nut (not shown), screwed onto a threaded end portion 10 of the shaft 1. The lock nut presses an end surface of the hub against an abutment on the shaft 2. A conical streamlining body 12 is designed to cover the lock nut and form an end to the hub.

As can be seen more clearly in FIG. 4, the bottoms of keyways 4 lie at an axial diameter which is less than the greatest diameter of the threaded portion 10. In order to make it possible to slip a propeller hub portion 6 with keys 8 fitting the keyways 4 (see FIG. 3) over the threaded portion 10, this portion is provided with axial grooves 13 which are extensions of the keyways/grooves 4 in the first axle portion 3 and have at least the same depth and cross sectional profile as the keyways 4. In the example shown in FIG. 4, the narrowest width of the keys 5 in the shaft portion 3 is approximately twice the greatest width of the keyways 4. Preferably the narrowest width of the keys 5 should be at least twice the greatest width of the keyways 4.

Figure 2:
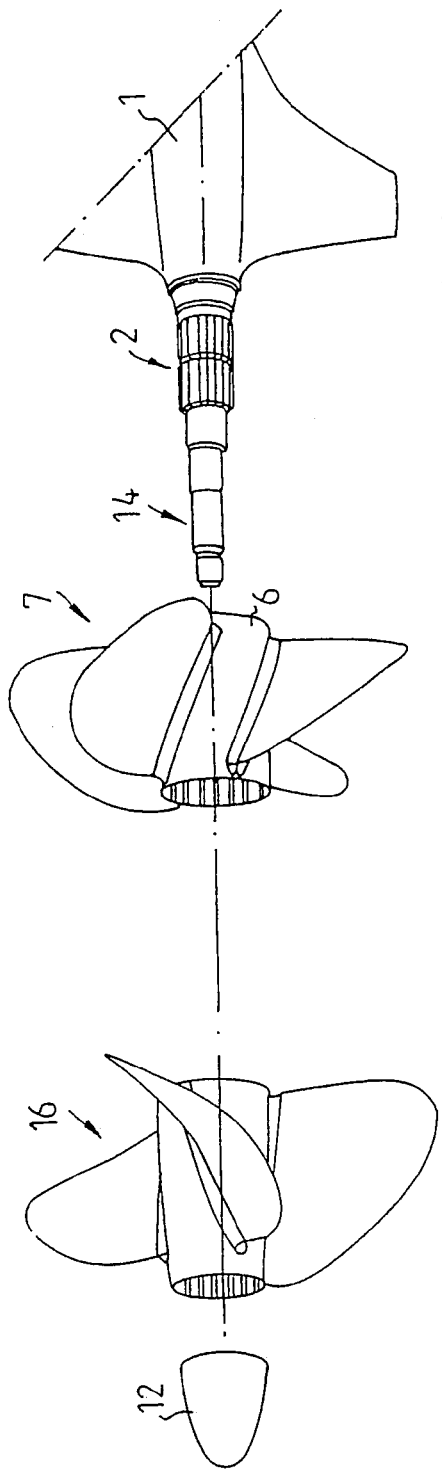
FIG. 2 is a view corresponding to FIG. 1 with a double propeller drive.
Figure 5:
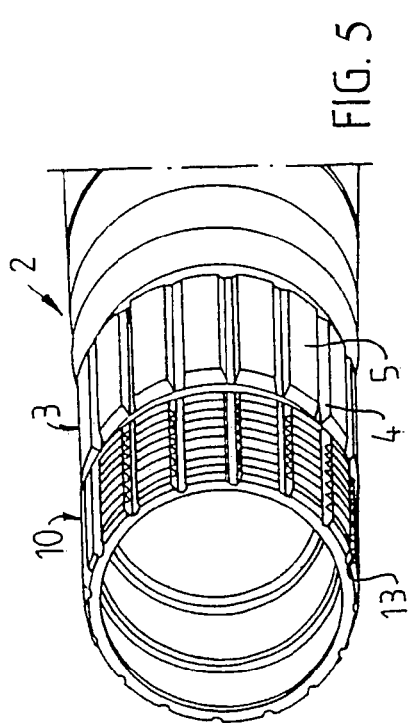
FIG. 5 is an enlargement of one end of a tubular shaft of the drive in FIG. 2.

FIG. 2 shows an embodiment with double propellers. Parts corresponding to those in FIG. 1 have been given the same reference numbers as in FIG. 1. The propeller shaft 2 is here a tubular shaft, in which a second propeller shaft 14 is rotatably mounted. The shaft 14 in the embodiment shown is provided with a portion with conventional splines, i.e. with identical keys and keyways, but within the scope of the invention it can have splines with different widths for the keys and keyways, as for the shaft 2. A second propeller 16 is fixed on the second propeller shaft 14 on the shaft portion with splines with the aid of a lock nut (not shown).

The embodiments shown and described have hub portions 6 with the same number of keys 8 as the number of keyways 4 in the propeller shaft portion 3, i.e. each key in the hub portion 6 engages in a key way 4 in the propeller shaft portion 3 to enable the splines connection to carry a maximum load. For lower loads, the hub portion 6 may be made with a fewer number of keys 8 than a number of keyways in the propeller shaft portion 3 so that the keys 8 only engage certain keyways 4. For example, the hub portion 6 can be made with half the number of keys 8 as the number of keyways 4 in the propeller shaft portion 3. These keys 8 in the hub portion are disposed so that they engage every other key way in the propeller shaft portion 3.

The invention claimed is:

1. Propeller shaft for marine drive units, comprising a first portion (3) with alternating external axial keyways (4) and keys (5) designed for fitted engagement with internal keys (8) and keyways (9) on a hub portion (6) of a propeller (7) and, between one end of the shaft and said first portion, a second portion (10) with external threads for engagement with an element provided with internal threads, characterized in that said first portion (3) is provided with keyways (4) which are narrower than keys (5) therebetween, characterized in that said second portion (10) has grooves (13) adapted to the keyways (4) at the first portion.

2. Propeller shaft according to claim 1, characterized in that the keys (5) are at least twice as wide as the keyways (4).

3. Propeller shaft according to claim 2, characterized in that the shaft (2) is a tubular shaft.

4. Propeller shaft according to claim 1, characterized in that the shaft (2) is a tubular shaft.

5. Propeller shaft for marine drive units according to claim 1, characterized in that the propeller hub portion (6) is provided with keyways (9) which are wider than the keys (8).

6. Propeller shaft according to claim 5, characterized in that the keyways (9) in the propeller hub portion (6) are at least twice as wide as the keys (8).

7. Propeller shaft according to claim 1 with a propeller comprising a hub portion (6) with alternating internal keyways (9) and keys (8) intended to engage corresponding external keys (5) and keyways (4) on a propeller shaft portion (3), characterized in that the propeller shaft portion (6) is provided with keyways (9) which are wider than the keys (8), characterized in that each keyway (4) in the propeller shaft portion (3) holds a key (8) of the propeller hub portion (6).

8. Propeller shaft according to claim 1 with a propeller comprising a hub portion (6) with alternating internal keyways (9) and keys (8) intended to engage corresponding external keys (5) and keyways (4) on a propeller shaft portion (3), characterized in that the propeller shaft portion (6) is provided with keyways (9) which are wider than the keys (8), characterized in that the propeller hub portion (6) has fewer keys (B) than the number of keyways (4) in the propeller shaft portion (3) and that only certain key-ways in the propeller shaft portion (3) hold a key (8) of the propeller hub portion (6).

* * * * *